United States Patent [19]

Snively

[11] Patent Number: 4,541,857

[45] Date of Patent: Sep. 17, 1985

[54] ORGANIC GROWTH INDUCING COMPOUND DEVELOPED FROM COAL AND ADDITIVES

[75] Inventor: Ross C. Snively, Salem, Ohio

[73] Assignee: Western Production Corporation, Emlenton, Pa.

[21] Appl. No.: 298,512

[22] Filed: Sep. 1, 1981

[51] Int. Cl.$^4$ ............................................. C05F 11/02
[52] U.S. Cl. ........................................... 71/24; 71/63; 71/903
[58] Field of Search ........................ 71/23, 24, 63, 903

[56] References Cited

U.S. PATENT DOCUMENTS 4,084,938  4/1978  Willard, Sr. ...................... 71/24 X

FOREIGN PATENT DOCUMENTS 513134   5/1955  Canada ................................. 71/24
1202696  8/1970  United Kingdom ................. 71/24

*Primary Examiner*—Ferris H. Lander

[57] ABSTRACT

A plant fertilizer composition comprises an admixture of particulate coal containing releasable plant nutrients, sodium molybdate for releasing said plant nutrients and auxiliary plant nutrient agents.

2 Claims, No Drawings

ORGANIC GROWTH INDUCING COMPOUND DEVELOPED FROM COAL AND ADDITIVES

BACKGROUND OF THE INVENTION

1. The Field of the Invention

This invention relates to a novel plant fertilizer composition and to a method of fertilizing plants growing in soil by applying thereto an effective amount of said composition. More particularly, the present invention relates to a novel plant fertilizer composition which comprises a particulate carbonaceous material containing releasable plant nutrients and an agent for releasing said plant nutrients in a form that the plants are capable of utilizing.

2. The Prior Art

Heretofore mixtures of carbonaceous materials such as coal and various additives have been used to fertilize growing plants and/or to condition the soil in which the plants are grown. U.S. Pat. No. 128,578 discloses a mixture of coal and iron sulfate while U.S. Pat. No. 143,213 discloses a mixture of coal and lime for such purposes.

Fertilizer compositions produced from coal and various additives have also been disclosed in U.S. Pat. Nos. 620,443 and 445,255 wherein the additive is phosphate rock and a reaction is effected by the addition thereto of sulfuric acid. In U.S. Pat. No. 1,196,889 a mixture of coal and natural salt water are subjected to a mild heat treatment to produce a fertilizer. A mixture of rock phosphate, lime, ammonium sulfate, salt and coal, in U.S. Pat. No. 2,059,600, is roasted at a temperature of 600°-800° F. to produce a fertilizer. U.S. Pat. No. 4,013,440 discloses extracting nitrogeous material from coal by treatment with urea to which is then added an oxidizing agent and an alkali. A more recent development in coal-based fertilizers is disclosed in U.S. Pat. No. 4,067,712 wherein lignite is treated with the reaction product of alkali metal silicate and a source of calcium ions and magnesium ions. A somewhat similar disclosure appears in U.S. Pat. No. 4,067,714.

SUMMARY OF THE INVENTION

The present invention provides a novel fertilizer for plants growing in soil which comprises an admixture of a particulate carbonaceous material, preferably coal, containing releasable plant nutrients and an effective amount of an agent for releasing said plant nutrients therefrom in a form that the plants are capable of utilizing. This plant nutrient release agent comprises a water-soluble source of molybdenum ions and a water-soluble source of sodium ions and is, preferably, sodium molybdate. The addition of burnt limestone, as well as other adjuvants, has been found vital and useful in plant nutrition and fertilizer formulation.

DETAILED DESCRIPTION OF THE INVENTION

In practicing the present invention the novel plant fertilizer is produced by intimately mixing particulate carbonaceous material, such as coal, with an agent which releases the plant nutrient values contained in the coal. Without being bound by any particular theory, it is believed that the release of the plant nutrient components of the coal occurs when the soluble molybdenum component catalyzes or otherwise causes a release of sodium in a form which "digests" the coal so as to render the nitrogen values and other plant nutrient values thereof available for assimilation or utilization by plants growing in the soil treated with the fertilizer of this invention. The molybdenum component is also believed to prevent dissipation of the nitrogen and other plant nutrient values in a form not utilizable by the plants. Burnt limestone has been found important to maximizing the utility of the fertilizer and in mixing with the sodium and molybdenum components with the coal component.

The coal component utilized in the present invention can be of any type, for instance, anthracite, bituminous, sub-bituminous or lignite, and can be of varying quality all of which generally contain from about 0.5 to 3.0 percent of known nitrogen. Other plant nutrients present in coal and made available for use by plants in accordance with the present invention include iron, phosphorus, potassium, sulfur or sulfates, calcium, chlorine and at least traces of manganese, copper, boron, cobalt, alumina and selenium.

A typical coal, useful in the present invention is one which has, on a dry basis, the following ultimate analysis: carbon: 73.19%; hydrogen: 5.05%; nitrogen: 1.32% chlorine: 0.07%; sulfur: 4.50% ash: 6.00% and oxygen: 9.87%. It also has the following mineral analysis-ignited basis: phosphorus pentoxide: 0.26%; silica: 32.95%; ferric oxide: 33.09%; alumina: 22.13%; titania: 0.68%; lime: 2.66%; magnesia: 0.52%; sulfur trioxide: 3.24%; potassium oxide: 1.43%; sodium oxide: 0.51%; and undetermined: 2.53%.

Preferably, the coal is comminuted to a size that passes through a 100 mesh Tyler Screen, although a size ranging from about −50 mesh to as small as about −300 mesh can be employed. It has been observed that a larger particulate size often delays or inhibits to an undesirable extent or degree the digestion of the coal and the ultimate release of the plant nutrient values therefrom.

Generally, the particulate coal is present in the plant fertilizer composition of this invention in an amount ranging from about 50 to 75 percent by weight based on the total weight of the composition.

As the agent for releasing the plant nutrients contained in the coal in a form that the plants are capable of utilizing, there are employed a water-soluble source of molybdenum ions and a water-soluble source of sodium ions. Conveniently, it has been found that sodium molybdate serves as the source of both types of ions. When sodium molybdate is employed as the plant nutrient release agent it is present generally in an amount ranging from about 0.001 to 0.100 percent by weight and preferably about 0.001 to 0.05 percent by weight, based on the total weight of the fertilizer composition of this invention.

It has also been found advantageous, and important, to incorporate borax (sodium tetraborate decahydrate), sulfates of metallic elements such as ferric sulfate, magnesium sulfate, zinc sulfate and copper sulfate, as well as sodium chloride, zinc chloride, sulfur, burnt limestone and cobalt carbonate into the plant fertilizer composition of this invention. These adjuvants serve not only to augment the nutrient value of the present fertilizer but they also function to enhance the release of sodium for the digestion of the coal and for the general digestion of the coal. These auxiliary plant nutrient release agents can be present generally in an amount ranging from about 24.900 to 49.999 percent and, preferably, from about 25.00 to 35.00 percent, by weight based on the total weight of the fertilizer composition.

The novel fertilizer composition of the present invention can be provided in dry form or, if desired, can be incorporated in an aqueous medium, generally in the form of a slurry.

The fertilizer composition is generally applied to the soil in the amount effective to fertilize the plants growing therein, the exact amount depending of course on such factors as the condition of the soil, the plant nutrient content of the soil, the type of plant or crop being grown and the like. Further, when the plant-fertilizer composition of the present invention is provided in liquid form, such as a slurry of dispersion, the same can be applied to plant leaves or root system by any convenient method such as spraying.

The following non-limiting examples are given to illustrate the present invention.

EXAMPLE 1

50 lbs. of coal were pulverized to a particle size of −100 mesh and admixed with 0.10 lbs of sodium molybdate. To this mixture there are added 0.50 lbs. magnesium sulfate, 1 lb. sodium chloride, 0.80 lb. zinc sulfate or zinc chloride, 1 lb. copper sulfate, 1 lb. borax, and 10 lbs burnt limestone.

The above fertilizer is applied to the soil in an amount of about 190 lbs/acre and it was observed the nitrogen content of the soil increased significantly several weeks after application.

EXAMPLE 2

A fertilizer for potatoes was produced by admixing the following materials: 120 lbs. of coal having a particle size of −100 mesh; 0.25 lb. of sodium molybdate; 10 lbs of ferric sulfate; 10 lbs of magnesium sulfate; 10 lbs of sodium chloride; 15 lbs of zinc sulfate; 20 lbs of copper sulfate; 24 lbs of sulfur; and 30 lbs of borax.

When the crop is red potatoes, it has been found advantageous to include about 3 lbs of cobalt carbonate to the above formulation.

Several important agranomic advantages are secured using the plant fertilizer composition of the present invention. Plants grown in soil treated with the fertilizer exhibit improved taste, color and size characteristics. Further, the plant growth rate and yield per acre are increased. It has also been observed that the use of the plant fertilizer of this invention increases the resistance of the plants to freeze damage and can improve resistance to disease, especially in the case of trees. Further, the plant fertilizer appears to have improved storage properties in that it does not readily or rapidly oxidize. Additionally, it has been observed that after a period of time, soil treated with the fertilizer composition of this invention not only requires less fertilizer of any kind to effectively replenish the plant nutrient values thereof, but the fertilizer also makes available to the plant the requisite nutrients during the early as well as the late stages of growth.

What is claimed is:

1. A plant fertilizer composition comprising an admixture of (a) particulate coal containing releasable plant nutrients, the maximum particle size of said coal being about 100 mesh, said particulate coal being present in an amount by about 50 to 75 weight percent based on the total weight of said composition, (b) sodium molybdate as an agent for releasing said plant nutrients in a form that the plants are capable of using, said sodium molybdate being present in an amount ranging from about 0.001 to 0.100 percent by weight based on the total weight of said composition and (c) an auxiliary plant nutrient release agent comprising one or more of ferric sulfate, magnesium sulfate, sodium chloride, zinc sulfate, zinc chloride, copper sulfate, sulfur, hydrated sodium borate, burnt limestone and cobalt carbonate, said auxiliary plant nutrient release agent being present in an amount ranging from about 24.900 to 49.999 weight present based on the total weight of said composition.

2. A method of fertilizing plants growing in soil comprising applying to said soil an effective amount of the composition of claim 1.

* * * * *